United States Patent [19]

Carlsson

[11] Patent Number: 4,654,201
[45] Date of Patent: Mar. 31, 1987

[54] PROCESS FOR PRODUCING A FLOCCULATING AGENT

[76] Inventor: Olof Carlsson, Tors väg 1, S-269 00 Båstad, Sweden

[21] Appl. No.: 797,887

[22] Filed: Nov. 14, 1985

[30] Foreign Application Priority Data

Nov. 14, 1984 [SE] Sweden .............................. 8405704

[51] Int. Cl.$^4$ ............................................. C01B 17/46
[52] U.S. Cl. .................................... 423/128; 423/132; 423/467; 423/556
[58] Field of Search ............... 423/132, 467, 556, 128

[56] References Cited

U.S. PATENT DOCUMENTS 3,929,666 12/1975 Aiba et al. ........................... 423/556

OTHER PUBLICATIONS

Comprehensive Treatise on Inorganic and Theoretical Chemistry, J. W. Mellor, Longmans, Green and Co. 1946, vol. V, pp. 336–339.

Primary Examiner—John Doll
Assistant Examiner—Jeffrey Edwin Russel
Attorney, Agent, or Firm—Merchant, Gould, Smith, Edell, Welter & Schmidt

[57] ABSTRACT

A process of producing a flocculating agent useful for water purification technology and as a substitute for aluminium sulphate in the rosin sizing of paper is described. In this process, about 100–150 parts by weight, preferably about 130 parts by weight of hydrochloric acid, calculated as 100% HCl, and 140–200, preferably 160–190 parts by weight of a sulphate-containing, aluminium hydroxide-containing sludge, calculated on the solids content of the sludge, are mixed. To obtain the sludge, alkaline pickles used in the pickling of aluminium profiles in connection with the anodization of aluminium are neutralized with sulphuric acid or aluminium sulphate. The sludge may also contain up to about 10% by weight of aluminium hydroxide. The mixture is heated and stirred at a temperature of from about 80° C. to the boiling point of the mixture, preferably 95°–100° C., for a combined time of about 3–15 hours, preferably about 4–6 hours. The reaction product is a substantially saturated aqueous solution of polyaluminium chloride having the presumed formula $$Al_a(OH)_b(SO_4)_cCl_{3a-b-2c}$$

wherein a, b and c may have the values 13, 34 and 1, respectively.

7 Claims, No Drawings

PROCESS FOR PRODUCING A FLOCCULATING AGENT

The present invention relates to a process of producing a flocculating agent useful in water purification technology and, in particular, as a substitute for aluminium sulphate in the rosin sizing of paper.

SE published application 7201333-7 (Publ. No. 372,497) discloses the production of a sulphate-containing basic aluminium chloride having the formula $[Al(OH)_xCl_y(SO_4)_{z/2}]_n$ wherein $x+y+z=3$, and $y+z$ represents a value between 1 and 2, and z a value between 0.02 and 0.3. This sulphate-containing basic aluminium chloride is useful in the purification of wastewater.

From DE patent specification 2,907,354 it is previously known to use, as a retention agent and sizing aid in paper technology, a basic aluminium chloride having the formula $$Al_n(OH)_mCl_{3n-m} \cdot SO_4$$

wherein $$100/3n = 50 \pm 5$$

and the anion $SO_4$ is present in the ratio $SO_4:Al=0.16$.

In the production of paper according to DE patent specification 2,907,354 there are added, in addition to the above-mentioned basic salt, also conventional additives, such as organic retention agents, for example cationic starch, polyacrylic amide and polyethylene imine.

GB-A-1,411,326 describes the production of a flocculating agent for the treatment of water by reacting wet red mud from the so-called Bayer process with sulphuric acid. In the Bayer process, alumina is produced from bauxite by leaching with sodium hydroxide solution at excess pressure. This means that several oxide impurities will remain undissolved, in particular iron oxide, and these impurities form the wet red mud. As a result, the flocculating agent produced will contain a large proportion of iron (but no chlorine). Furthermore, it appears that the reaction product is simultaneously dried and comminuted, i.e. the finished reaction product is in the dry state.

GB-A-2,128,977 describes the production of basic aluminium chloride by reacting hydrochloric acid with aluminium hydroxide under pressure, while simultaneously and separately producing basic aluminium sulphate by reacting sulphuric acid with aluminium hydroxide, whereupon the basic aluminium chloride and the basic aluminium sulphate are combined and allowed to react with one another at a temperature of 80°–120° C.

The flocculating agent produced in accordance with the process of the present invention is a polymeric sulphate-containing aluminium hydroxychloride having the presumed general formula $$Al_a(OH)_b(SO_4)_{hd\ c}Cl_{3a-b-2c}$$

in the form of an aqueous substantially saturated solution. Typical values of a, b and c in the above formula are $a=13$, $b=34$ and $c=1$. Besides water, the solution contains about 20–30% by weight, usually about 27% by weight of solids, and more particularly 5–5.5% by weight Al, 9–13% by weight Cl, 0.8–4% by weight $SO_4$, and 0.5–1% by weight Na. Preferably, the solution contains, in addition to water, about 5.4% by weight Al, about 9.0% by weight Cl, about 2.5% by weight $SO_4$ and about 0.5% by weight Na.

Not only is the flocculating agent produced in accordance with the present invention highly efficient in water purification technology and in the rosin sizing of paper, it also distinguishes from other similar prior art products in that it has a higher chloride content. However, the specifically novel matter in the present invention is the manner in which the flocculating agent is produced, and also the special starting materials that are used in the production, whereby it is possible to produce an efficient flocculating agent at low cost. At the same time, a difficult environmental problem is eliminated, and furthermore an environmentally hazardous waste material is turned to account.

Thus, the pickling of aluminium in alkaline pickles, for example in the anodic treatment of aluminium, produces large quantities of spent pickle which constitute an environmental hazard and are difficult to remove, also after neutralisation with, for example, sulphuric acid or aluminium sulphate, for precipitation of the impurities in the pickle in the form of a sludge. Prior to neutralisation, the spent pickle may be said to consist, in principle, of a sodium aluminate solution which, after neutralisation with sulphuric acid or aluminium sulphate, forms a sludge consisting of a neutral mixture of aluminium hydroxide and aluminium sulphate. Generally, the sludge has a dry content of 15–40% by weight and contains, besides water, about 5–15% by weight Al, about 2–4% by weight Na, and about 3–10% by weight $SO_4$. Usually, the sludge occurs in the form of a 17–18% by weight aqueous suspension, or in the form of a press cake having a dry content of about 36–40% by weight.

The present invention has now surprisingly discovered a process by which the above-mentioned environmentally hazardous waste sludge can be turned to account by reacting it with hydrochloric acid to form a flocculating agent.

The characteristic features of the invention will appear from the appended claims.

To carry the process according to the invention into effect, a starting material is employed which consists of hydrochloric acid in the form of an aqueous solution having a HCl concentration of about 25–35% by weight, preferably about 30% by weight. In addition to hydrochloric acid, the above-mentioned sludge is included as a constituent in the starting material. As has been mentioned before, the sludge may be said to consist generally of a neutral mixture of aluminium hydroxide and aluminium sulphate. Part of the aluminium hydroxide content of the sludge may consist of aluminium hydroxide powder which has been added separately to the sludge. Such addition of aluminium hydroxide to the sludge is effected above all in order to increase the aluminium content in case the original aluminium content of the sludge is low. The quantity of aluminium hydroxide added amounts to at most 10% by weight, preferably at most 5% by weight, based on the sludge. Since the aluminium hydroxide added merely is intended, if necessary, to adjust the aluminium content of the sludge, the aluminium hydroxide, in the context of the present invention, is not regarded as a separate constituent of the starting material, but is included in the sludge.

In the process according to the present invention, the two constituents mentioned above, i.e. the hydrochloric acid and the sludge, are caused to react with one another under certain specific conditions and in certain specific proportions. More particularly, about 100-150 parts by weight, preferably about 130 parts by weight of hydrochloric acid, calculated as 100% HCl, are mixed with about 140-200 parts by weight, preferably about 160-190 parts by weight of sludge, calculated on the solids content of the sludge and including any aluminium hydroxide added, and these constituents are heated at a temperature from about 80° C. to the boiling point of the mixture, which usually lies at about 105° C., for a combined time of about 3-15 hours, and at the end of the reaction time the suspended material has been substantially solubilised. In the context of the invention, it is preferred to work within the temperature range 90°-100° C., most preferably about 95°-100° C. The reaction time preferably is about 4-8 hours, most preferably about 4-6 hours. Furthermore, it is suitable, in the reaction process according to the present invention, to add the sludge in two lots, a minor proportion of the sludge being added with the first lot, and the major proportion with the second lot, after the first proportion has been solubilised. The above-mentioned reaction times refer to the total time for both additions. The finished product obtained in the process of the present invention is an essentially saturated aqueous solution of polyaluminium chloride having a solids content of about 20-30% by weight and an aluminium content of about 5.5-6% by weight. As has been mentioned by way of introduction, the finished product may be used as a flocculating agent in water purification technology and in the rosin sizing of paper.

To facilitate understanding of the invention, the following elucidative and nonrestrictive Examples are given. In these Examples, all proportions and percentages are by weight, unless otherwise stated.

EXAMPLE 1

A glass container equipped with a heater and a stirrer was batched with 420 g of 31% hydrochloric acid, 200 g of sulphate-containing, aluminium hydroxide-containing sludge having a dry content of about 18% by weight and obtained by neutralisation of an alkaline pickle upon anodisation of aluminium. The sludge analysis was as follows: Al about 5% by weight, Na about 2% by weight and $SO_4$ about 4% by weight. Also added to the sludge were 50 g of aluminium hydroxide [$Al(OH)_3 \cdot 3H_2O$].

The above-mentioned mixture was heated and stirred at 100° C. for about 6 hours when an essentially clear solution had been obtained. After that, about 600 g more of the above-mentioned sludge were added, and stirring and heating was continued for about 7 hours until an essentially clear solution had been obtained.

The resulting product was successfully used in the rosin sizing of paper.

EXAMPLE 2

The equipment described in Example 1 was batched with 420 g of 31% hydrochloric acid and 400 g of a sulphate-containing, aluminium hydroxide-containing sludge corresponding to the one used in Example 1, except that the solids content was about 28% by weight. The following values were analysed: Al about 10% by weight, Na about 3.5% by weight and $SO_4$ about 7% by weight. In view of the high aluminium content of the sludge, no special addition of aluminium hydroxide was necessary in this case.

The above mixture was heated and stirred at about 102° C. for about 3 hours until an essentially clear solution had been obtained. After that a further 400 g of sludge was added, and this sludge was the sludge used in Example 1. The whole was then heated and stirred for about 2 hours more at 100° C., whereupon the reaction was complete.

The resulting product was found to be an excellent flocculating agent for water purification and rosin sizing of paper.

EXAMPLE 3

The equipment described in Example 1 was batched with 420 g of 31% hydrochloric acid and 250 g of sulphate-containing, aluminium hydroxide-containing sludge corresponding to the one used in the preceding Examples, but with a dry content of about 36% by weight and an analysis which indicated an Al content of about 14% by weight, an Na content of about 3% by weight, and an $SO_4$ content of about 8% by weight. The mixture was heated and stirred at about 100° C. for about 3 hours until an essentially clear solution had been obtained.

After that, 550 g of the sludge used in Example 1 were added, and stirring and heating continued at 103° C. for about 3 hours until the reaction was complete.

The resulting product was found to be an excellent flocculating agent for water purification and rosin sizing of paper.

EXAMPLE 4

The equipment described in Example 1 was batched with 420 g of 31% hydrochloric acid and 600 g of the sludge used in the first step of Example 2. The mixture was heated for about 4 hours at 102° C. and was then diluted with about 200 g of water which was admixed during 30 min. The admixture of water was made to reduce the aluminium content of the reaction product to below 6% by weight because an aluminium content of more than about 6% by weight gives an unstable product which easily crystallises.

EXAMPLE 5

The equipment described in Example 1 was batched with 420 g of 31% hydrochloric acid and 450 g of the sludge used in the first step of Example 3. The mixture was heated and stirred at 102° C. for about 5 hours, whereupon 350 g of water were admixed for 30 min.

The resulting product was an excellent flocculating agent for water purification and rosin sizing of paper.

What I claim and desire to secure by Letters Patent is:

1. A process of producing a flocculating agent, wherein an aqueous mixture of 100-150 parts by weight of hydrochloric acid, calculated as 100% HCl, and 140-200 parts by weight of a sulphate-containing, aluminum hydroxide-containing sludge, calculated on the solids content of the sludge, is prepared and heated at a temperature of from about 80° C. to the boiling point of the mixture for a total time of about 3-15 hours, wherein sid sludge is obtained by the neutralization of a spent alkaline aluminum pickle.

2. A process as claimed in claim 1, wherein the mixture is heated at a temperature of 95°-100° C.

3. A process as claimed in claim 1, wherein the mixture is heated for 4-6 hours.

4. A process as claimed in claim 1, wherein the sludge has been obtained by neutralisation of the pickle with aluminium sulphate.

5. A process as claimed in claim 1, wherein the sludge has a solids content of 15–40% by weight.

6. A process as claimed in claim 1, wherein the sludge contains, besides water, 5–15% by weight Al, 2–4% by weight Na, and 3–10% by weight $SO_4$.

7. A process as claimed in claim 1, wherein the sludge contains an amount of up to about 10% by weight of added aluminum hydroxide which is effective to adjust the amount of aluminum in the sludge to about 5–15% by weight.

* * * * *